(12) United States Patent
Doddapadam Srinivasa Raghavachar et al.

(10) Patent No.: US 7,764,485 B2
(45) Date of Patent: Jul. 27, 2010

(54) ELECTRICAL DISTRIBUTION DEVICE ASSEMBLY

(75) Inventors: Partha Sarathy Doddapadam Srinivasa Raghavachar, Karnataka (IN); Janakiraman Narayanan, Andra Pradesh (IN); Soundararajan Narayanasamy, Hyderabad (IN)

(73) Assignee: General Electric Company, Schenectady, NY (US)

( * ) Notice: Subject to any disclaimer, the term of this patent is extended or adjusted under 35 U.S.C. 154(b) by 143 days.

(21) Appl. No.: 12/103,105

(22) Filed: Apr. 15, 2008

(65) Prior Publication Data

US 2009/0257857 A1   Oct. 15, 2009

(51) Int. Cl.
   *H02B 11/12*   (2006.01)
(52) U.S. Cl. .............. 361/608; 200/50.21; 361/609
(58) Field of Classification Search .......... 200/50.17, 200/50.21, 50.23, 50.24, 50.25, 50.27; 361/605–606, 361/608–609
See application file for complete search history.

(56) References Cited

U.S. PATENT DOCUMENTS

| | | | | |
|---|---|---|---|---|
| 2,295,405 A | * | 9/1942 | Johnson et al. ............... | 104/91 |
| 2,711,462 A | * | 6/1955 | Rouse ......................... | 200/293 |
| 2,809,086 A | * | 10/1957 | Fall ............................. | 312/323 |
| 3,663,773 A | * | 5/1972 | Powell ..................... | 200/50.24 |
| 4,002,864 A | * | 1/1977 | Kuhn et al. .............. | 200/50.21 |
| 4,004,113 A | * | 1/1977 | Ericson et al. ........... | 200/50.26 |
| 4,017,698 A | * | 4/1977 | Kuhn et al. .............. | 200/50.21 |
| 4,317,160 A | * | 2/1982 | Tillson et al. .............. | 361/609 |
| 4,486,814 A | * | 12/1984 | Ishikawa et al. ............ | 361/609 |
| 4,728,757 A | * | 3/1988 | Buxton et al. ............ | 200/50.21 |
| 5,036,427 A | * | 7/1991 | Krom et al. ................. | 361/609 |
| 5,309,317 A | * | 5/1994 | Ishikawa ..................... | 361/609 |

* cited by examiner

*Primary Examiner*—Gregory D Thompson
(74) *Attorney, Agent, or Firm*—Global Patent Operation; Stephen G. Midgley (57) ABSTRACT

An electrical distribution device assembly includes a drawout substructure having at least first and second opposing side portions. The electrical distribution device assembly also includes a telescoping rail unit mounted to one of the first and second opposing side portions. The telescoping rail unit includes a carrier rail having a carrier rail support surface and a loading rail having a loading rail support surface. The loading rail is slidably supported by the carrier rail to define an extended deployed configuration and a retracted stowed configuration. The electrical distribution device assembly also includes an electrical device is supported upon at least one of the carrier rail and the loading rail and is selectively shiftable into and out from the drawout substructure.

6 Claims, 6 Drawing Sheets

ELECTRICAL DISTRIBUTION DEVICE ASSEMBLY

BACKGROUND OF THE INVENTION

The present disclosure relates to the art of electrical distribution equipment and, more particularly, to a loading rail assembly for an electrical distribution device assembly.

Conventional switchgears include a plurality of drawout units each housing one or more switching devices, such as motor controllers and circuit breakers. Each switching device is releasably interconnected to one or more busbars. Periodically, the drawout units require removal to facilitate maintenance and or replacement of the associated switching devices. In many cases, removal of the drawout units is a relatively simple task. An operating bar is actuated to urge the drawout unit away from the busbar to disconnect the switching device. At this point, the drawout unit is simply shifted out and removed. In other cases, removal of the drawout unit requires special handling equipment.

Larger switchgear often times employ circuit breakers that weigh in excess of 250 kg. Removing and/installing a drawout unit provided with such a circuit breaker generally requires a crane. The crane is used to either lift and position the drawout unit at the switchgear, or remove and lower the drawout unit from the switch gear. In either case, supporting the drawout unit at the switchgear for attachment/removal of the crane is awkward. The drawout unit is supported an opening of the switch gear and often times cluster contacts on the circuit breaker do not completely clear secondary contacts located on a substructure within the housing. Thus, front and back alignment is often necessary when loading the circuit breaker from the crane during installation and removal.

BRIEF DESCRIPTION OF THE INVENTION

An electrical distribution device assembly constructed in accordance with exemplary embodiments of the invention include a drawout substructure having at least first and second opposing side portions. The electrical distribution device assembly also includes a telescoping rail unit mounted to one of the first and second opposing side portions. The telescoping rail unit includes a carrier rail having a carrier rail support surface and a loading rail having a loading rail support surface. The loading rail is slidably supported by the carrier rail to define an extended deployed configuration and a retracted stowed configuration. The electrical distribution device assembly also includes an electrical device is supported upon at least one of the carrier rail and the loading rail and is selectively shiftable into and out from the drawout substructure.

Other exemplary embodiments of the invention include a method of loading an electrical device into a drawout substructure. The method includes shifting a telescoping rail unit mounted to one of first and second opposing side walls of the drawout substructure from a stowed configuration, wherein the telescoping rail unit is positioned within the drawout substructure, to a deployed configuration wherein the telescoping rail unit extends out from the drawout substructure. The telescoping rail unit includes at least a carrier rail and a loading rail. The method further includes supporting an electrical device upon at least one of the carrier rail and the loading rail, and shifting the electrical device upon the at least one of the carrier rail and the loading rail into the drawout substructure to engage an electrical contact.

Additional features and advantages are realized through the techniques of exemplary embodiments of the invention. Other embodiments and aspects of the invention are described in detail herein and are considered a part of the claimed invention. For a better understanding of the invention with advantages and features thereof, refer to the description and to the drawings.

DETAILED DESCRIPTION OF THE INVENTION

Figure 1:
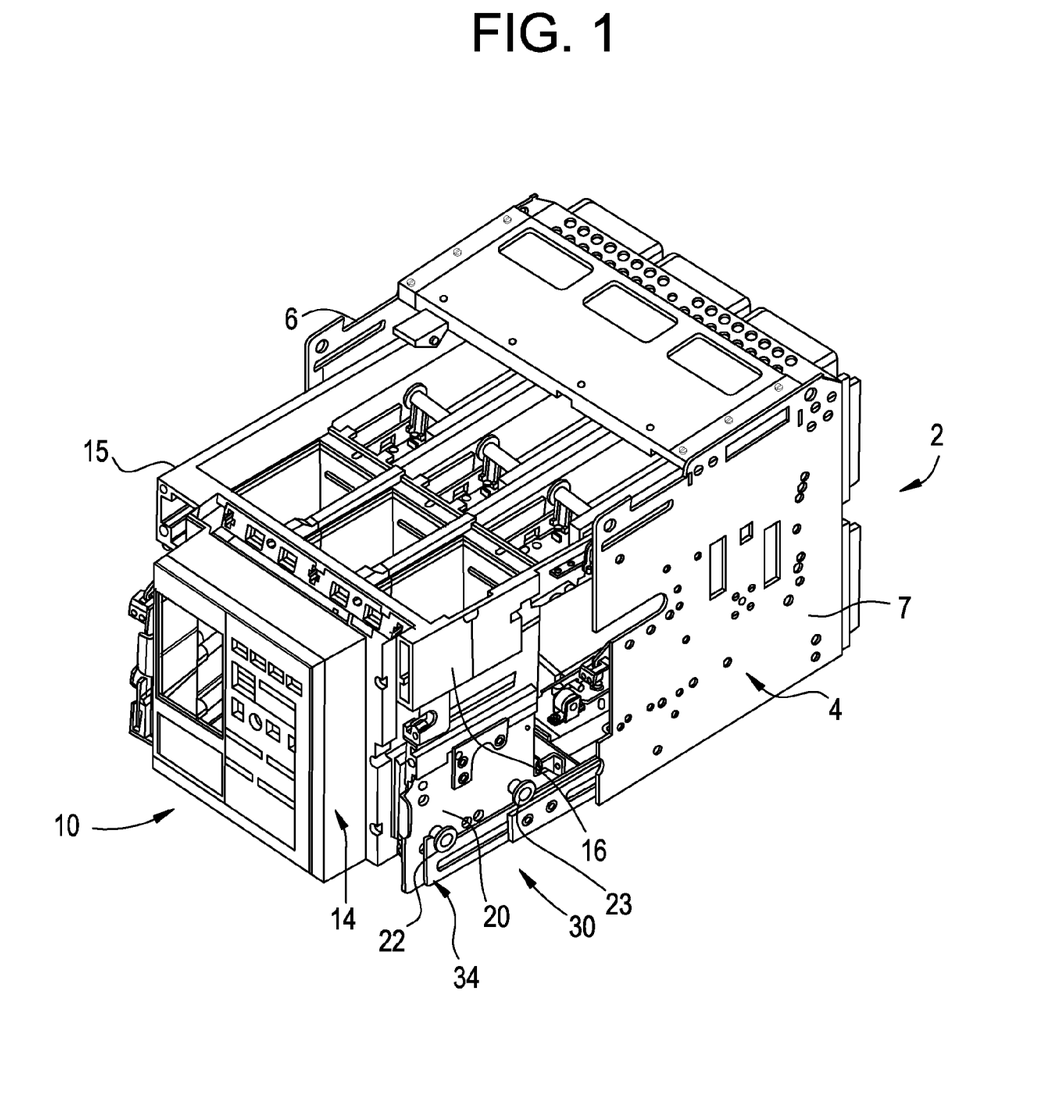
FIG. 1 is a right perspective view of an electrical distribution device assembly illustrating an electrical device supported upon a loading rail assembly constructed in accordance with an exemplary embodiment of the invention.
Figure 2:
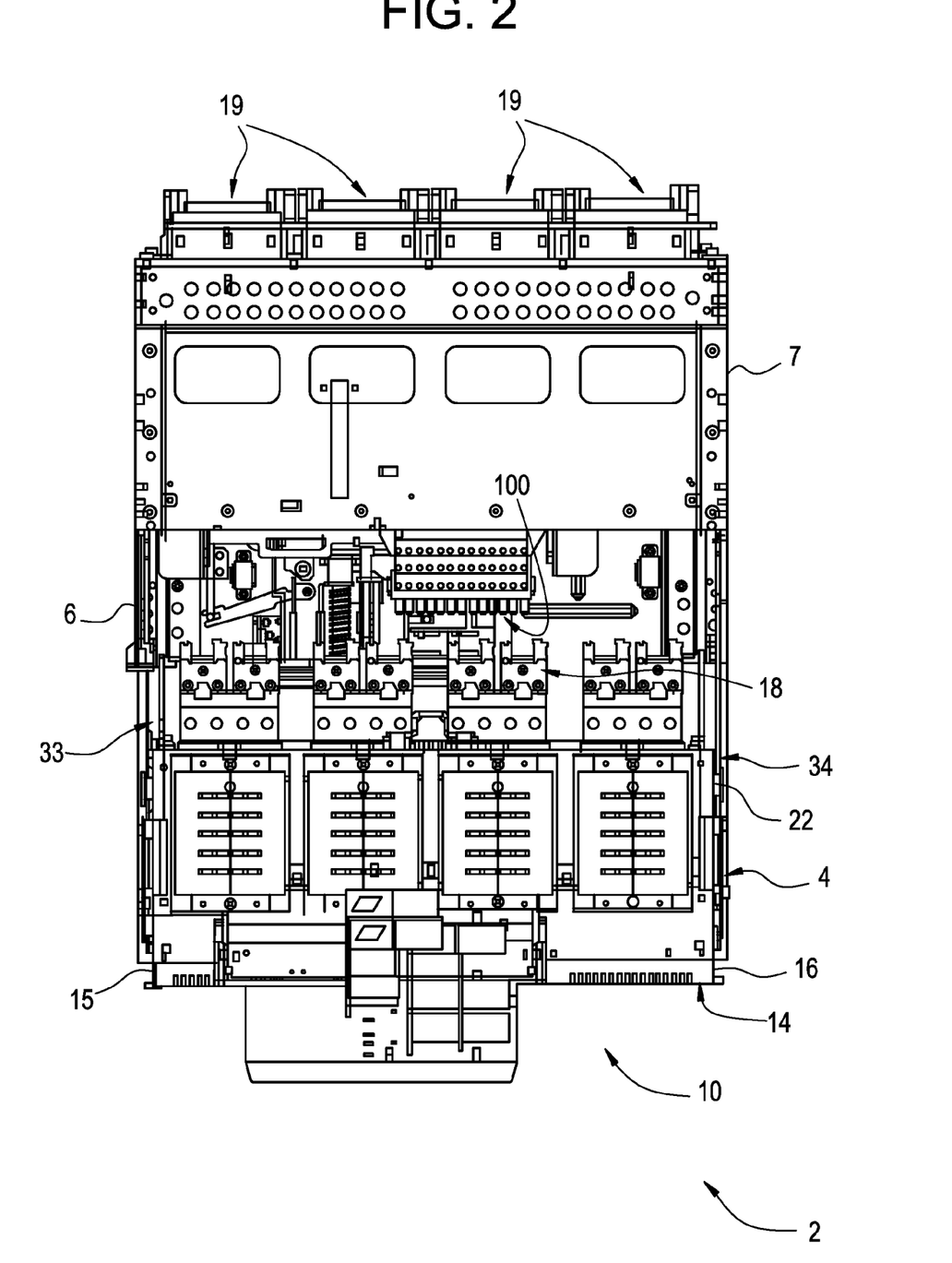
FIG. 2 is an upper plan view of the electrical device of FIG. 1.
Figure 3:
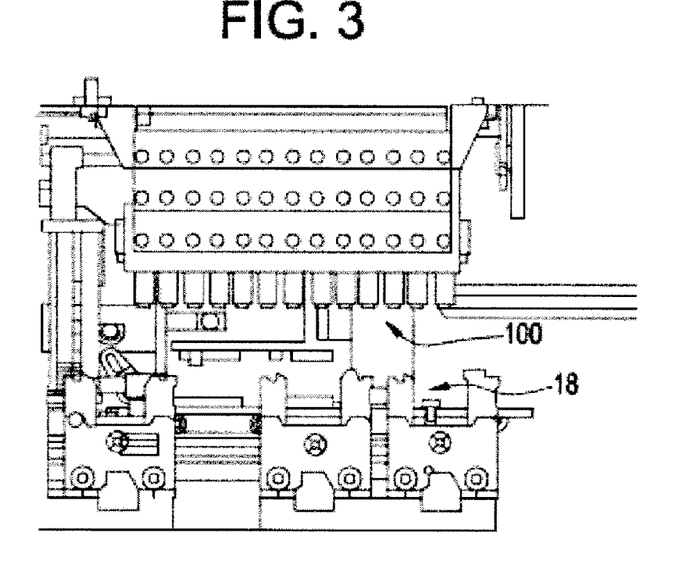
FIG. 3 is a detail view of the electrical device of FIG. 2 illustrating cluster finger and auxiliary contact alignment facilitated by the loading rail assembly in accordance with an exemplary embodiment of the invention.

With initial reference to FIGS. 1-3, an electrical distribution device assembly constructed in accordance with an exemplary embodiment of the invention is indicated generally at 2. Electrical distribution device assembly 2 includes a housing or drawout substructure 4 having at least a first side wall 6 and an opposing, second side wall 7. Electrical distribution device assembly 2 further includes an electrical device, shown in the form of a circuit breaker 10, positioned in drawout substructure 4. Circuit breaker 10 includes a main body 14 having first and second side surfaces or portions 15 and 16 and a plurality of cluster fingers, two of which are indicated generally at 18. As will be discussed more fully below, cluster fingers 18 are configured to engage primary contacts or substructure stabs 19 provided in drawout substructure 4. Circuit breaker 10 is also shown to include a mounting plate 20 mounted to second side portion 16. Mounting plate 20 includes a pair of glide members 22 and 23. In the exemplary embodiment shown, glide members 22 and 23 take the form of rollers that are rotateably supported upon mounting plate 20. Although not shown, it should be understood that side portion 15 includes a corresponding mounting plate and additional glide members. In the configuration shown, glide members 22 and 23, as well as the additional glide members, rest upon a loading rail assembly 30. With this arrangement, circuit breaker 10 is readily installed into drawout substructure 4 (See FIG. 6) to engage primary electrical contacts (not shown) and auxiliary contacts 19.

Figure 4:
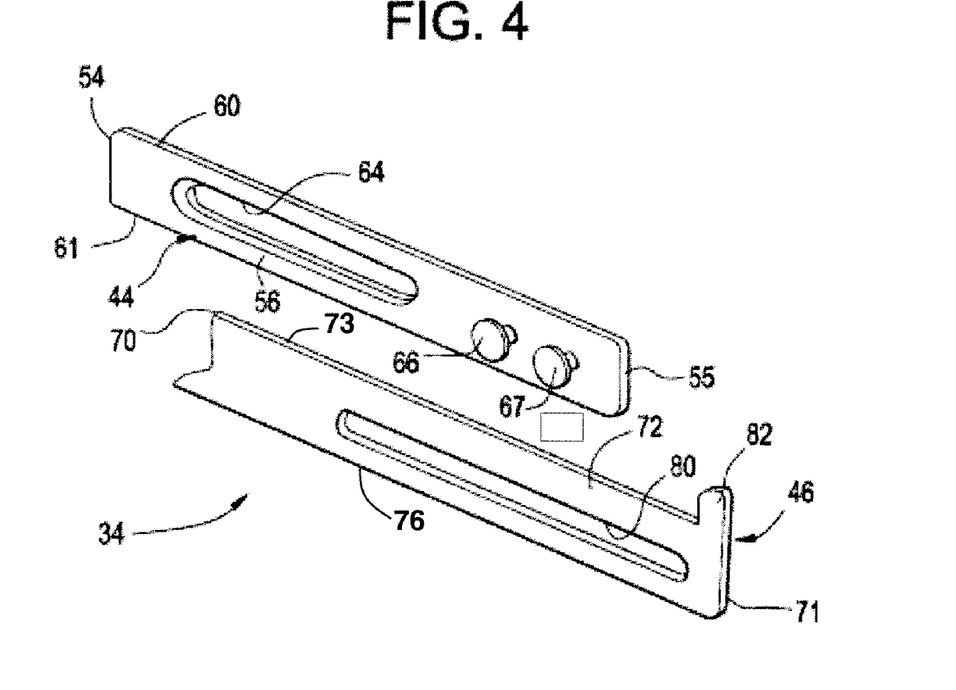
FIG. 4 is an exploded view of a telescoping rail unit of the loading rail assembly of FIG. 1.

As best shown in FIG. 4, loading rail assembly 30 includes a first telescoping rail unit 33 mounted to side wall 6 and a second telescoping rail unit 34 mounted to side wall 7. At this point it should be understood that each telescoping rail unit is constructed similarly, such that a detailed description will follow referencing second telescoping rail unit 34 with an understanding that first telescoping rail unit 33 includes corresponding structure. Telescoping rail unit 34 includes a first or carrier rail 44 and a second or loading rail 46. Carrier rail 44 includes a first end section 54 that extends to a second end section 55 through an intermediate section 56. Intermediate section 56 includes a first edge or carrier rail support surface 60 and a second edge 61, that extend between first and second end sections 54 and 55. Intermediate section 56 also includes a slot 64 that extends longitudinally along carrier rail 44 between first and second end sections 54 and 55. Slot 64 is configured to slidingly engage a pin element (not shown) mounted on an inner surface (not separately labeled) of side portion 7. Carrier rail 44 is also shown to include first and second pin members 66 and 67 that provide a sliding interface for loading rail 46. In the exemplary embodiment shown, first pin member 66 is vertically offset relative to second pin member 67. With this arrangement, when loading rail 46 and carrier rails 44 are interconnected, the vertical offset creates a pre-loading condition that enables telescoping rail unit 34 to support large loads with little deflection or deformation.

In a manner similar to that described above, loading rail 46 includes a first end section 70 that extends to a second end section 71 through an intermediate section 72. Intermediate section 72 includes a first edge or carrier rail support surface 76 and an opposing second edge 73, which extend between first and second end sections 70 and 71. Intermediate section 72 also includes a slot 80 that extends longitudinally along loading rail 46 between first and second end sections 70 and 71. Slot 80 is configured to slidingly engage pin members 66 and 67 to establish a sliding interface for loading rail 46 as will be discussed more fully below. Loading rail 46 also includes a tab portion 82 provided at second end section 71. Tab portion 82 provides structure that enables technicians to readily grasp and slide telescoping rail unit 34 out from drawout substructure 4. In addition, tab member 82 serves as a stop that prevents electrical deice 10 from rolling off of loading rail assembly 30.

Figure 5:
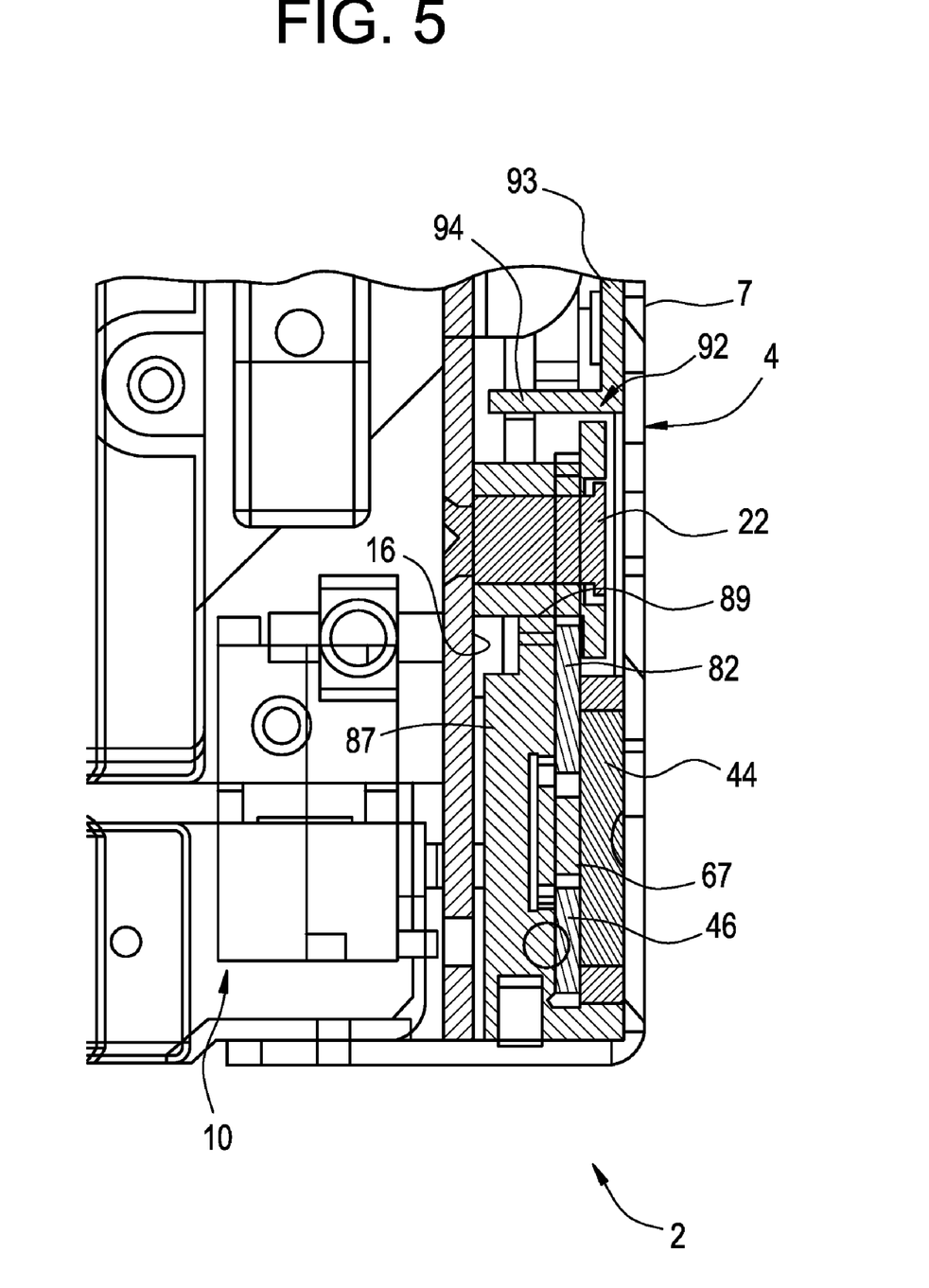
FIG. 5 is a partial elevational view of the electrical distribution device assembly of FIG. 1.
Figure 7:
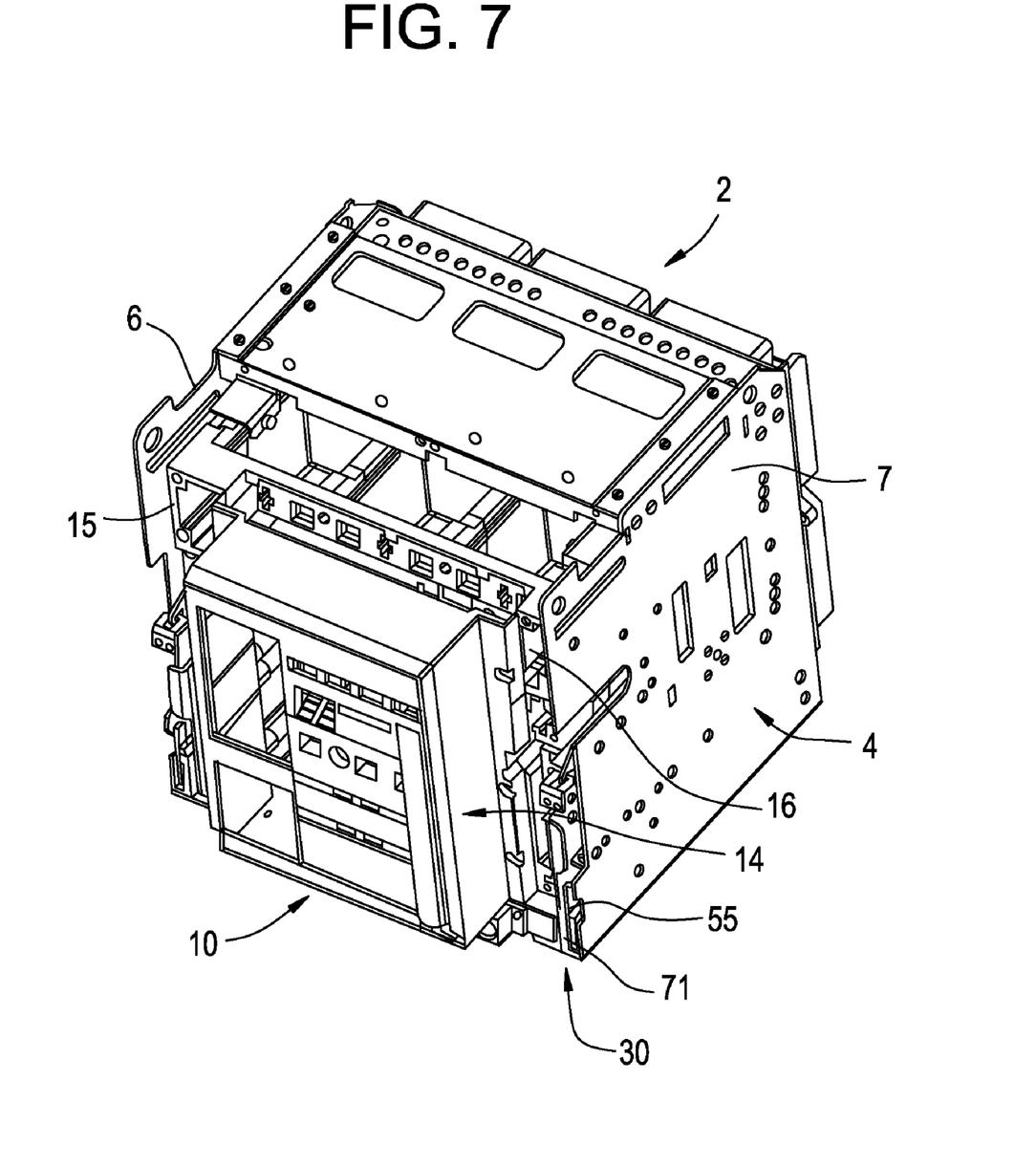
FIG. 7 is a right perspective view of the electrical distribution device assembly of FIG. 6 illustrating the loading rail assembly shifted to a stowed configuration.

As best shown in FIG. 5, electrical distribution device assembly 2 also includes an electrical device rest 87 mounted to the inside surface (not separately labeled) of side wall 7. Electrical device rest 87 includes an electrical device support surface 89 that is vertically offset from carrier rail support surface 60 and loading rail support surface 76. With this arrangement, as electrical device 10 is shifted into drawout substructure 4, glide members 22 and 23 transition from loading rail assembly 30 onto electrical device support surface 89. Once unloaded, each telescoping rail unit 34 is readily shiftable to a stowed configuration such as shown in FIG. 7. In addition, electrical distribution device assembly 2 includes an L-shaped flange 92 mounted to the inner surface (not separately labeled) of side wall 7. L-shaped flange 92 includes a vertical section 93 and a horizontal section 94. Horizontal section 94 is vertically offset from electric device support surface 89 by a distance slightly larger than a diameter of glide members 22 and 23. With this arrangement, L-shaped flange 92 serves to constrain movement of electrical device 10 to a horizontal plane when shifting between engaged and disengaged configurations as will be discussed more fully below. That is, L-shaped flange 92 prevents rotational movement of electrical device 10 that would otherwise cause cluster fingers 18 to disengage from substructure stabs 21 and come in contact with auxiliary contacts 100 (See FIGS. 2 and 3) arranged within drawout substructure 4.

Figure 6:
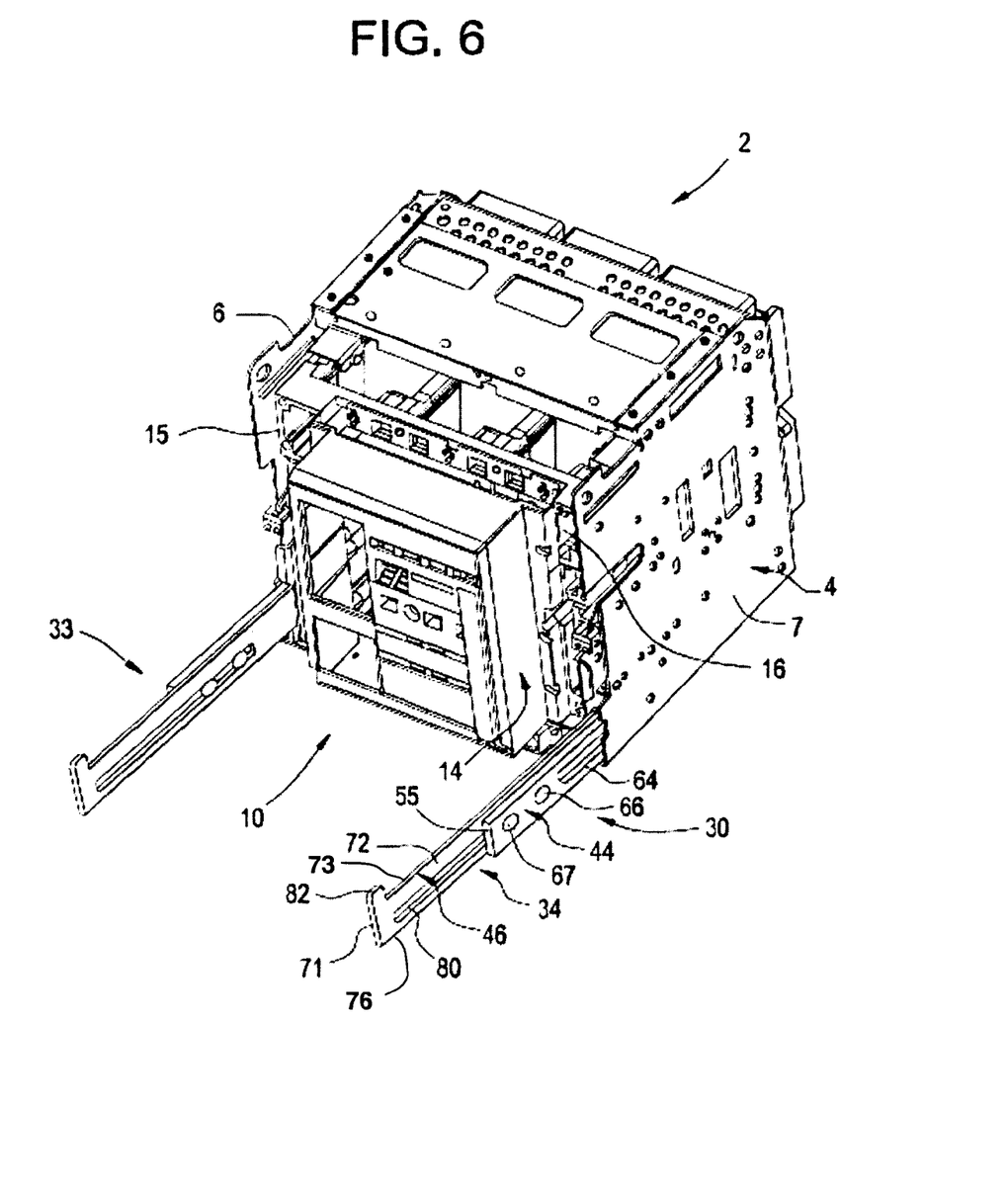
FIG. 6 is a right perspective view of the electrical distribution device assembly of FIG. 1 illustrating the electrical device shifted into a drawout substructure and the loading rail assembly a deployed configuration.

In accordance with an exemplary embodiment of the invention, when removal of electrical device 10 is necessary such as, for replacement and/or maintenance, telescoping rail units 33 and 34 are shifted from the stowed configuration, such as shown in FIG. 7 to an extended or deployed configuration such as shown in FIGS. 1 and 6 where both carrier rail 44 and loading rail 46 extend beyond a front edge (not separately labeled) of drawout substructure 4. Electrical device 10 is shifted from electrical device support surface 89 onto loading rail assembly 30. Electrical device 10 is shifted along loading rail assembly 30 onto loading rail support surface 76. At this point, it should be understood, that by establishing a pre-load at pin members 66 and 67, loading rail 46 does not bend or deform despite large loads being cantilevered from loading rail assembly 30. Once electrical device 10 is completely withdrawn from drawout substructure 4 and both primary contacts 19 and auxiliary contacts 100 are completely clear from cluster fingers 18. Electrical device 10 is lifted via a crane (not shown) and removed from telescoping rail units 33 and 34. At this point, first and second telescoping rail units can be shifted back to the stowed configuration such as shown in FIG. 7 where both carrier rail 44 and loading rail 46 are completely contained within drawout substructure 4 or left deployed until electrical device 10 is returned and re-introduced into drawout substructure 4.

At this point it should be appreciated that loading rail assembly 30 provides an easily deployable/stowable supporting surface that enable an electrical device, such as a circuit breaker, to be fully supported at a drawout substructure while being completely clear of all auxiliary electrical contacts. In addition, by providing a pre-load for the loading rail, the loading rail assembly can easily support circuit breakers that weigh in excess of 250 kg without any appreciable deflection/deformation. Furthermore, exemplary embodiments of the invention constrain movement of the electrical device to a horizontal plane to reduce tipping during installation and/or removal. Finally, the use of glide members mounted to the electrical device enhances alignment between the cluster fingers and the auxiliary fingers without requiring any lateral shifting during loading.

In general, this written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of exemplary embodiments of the invention if they have structural elements that do not differ from the literal language of the claims, or if they include equivalent structural elements with insubstantial differences from the literal language of the claims.

The invention claimed is:

1. A method of loading an electrical device into a drawout substructure, the method comprising:

shifting a telescoping rail unit mounted to one of first and second opposing side walls of the drawout substructure from a stowed configuration, wherein the telescoping rail unit is positioned within the drawout substructure, to a deployed configuration wherein the telescoping rail unit extends out from the drawout substructure, the telescoping rail unit including at least a carrier rail and a loading rail;

supporting the electrical device upon at least one of the carrier rail and the loading rail;

shifting the electrical device upon the at least one of the carrier rail and the loading rail into the drawout substructure to engage an electrical contact; and shifting the electrical device from the one of the carrier rail and the loading rail to a electrical device rest mounted to the one of the first and second opposing side walls of the drawout substructure, the electrical device rest being vertically offset from the telescoping rail unit.

2. The method of claim 1, further comprising: shifting the telescoping rail unit back to the stowed configuration.

3. The method of claim 1, further comprising: constraining the electrical device to movement along a substantially horizontal plane when the electrical device is supported within the drawout substructure.

4. The method of claim 1, wherein shifting the telescoping rail unit from the stowed configuration comprises:

extending at least a portion of both the loading rail and the carrier rail beyond a front edge portion of the drawout substructure, and wherein shifting the telescoping rail unit back to the stowed configuration further includes shifting both the loading rail and the carrier rail completely within the drawout substructure.

5. The method of claim 1, further comprising:

shifting another telescoping rail unit mounted to another of the first and second opposing side walls of the drawout substructure from a stored configuration, wherein the another telescoping rail unit is positioned within the drawout substructure, to a deployed configuration wherein the another telescoping rail unit extends out from the drawout substructure, the another telescoping rail unit including at least another carrier rail and another loading rail; and supporting the electrical device upon the telescoping rail unit and the another telescoping rail unit.

6. The method of claim 1, further comprising:

pre-loading a connection between the carrier rail and the loading rail.

* * * * *

UNITED STATES PATENT AND TRADEMARK OFFICE
CERTIFICATE OF CORRECTION

PATENT NO. : 7,764,485 B2  Page 1 of 1
APPLICATION NO. : 12/103105
DATED : July 27, 2010
INVENTOR(S) : Doddapadam Srinivasa Raghavachar et al.

It is certified that error appears in the above-identified patent and that said Letters Patent is hereby corrected as shown below:

In Column 5, Line 10, in Claim 5, delete "stored" and insert -- stowed --, therefor.

Signed and Sealed this

Seventh Day of December, 2010

David J. Kappos
*Director of the United States Patent and Trademark Office*